United States Patent Office 3,118,946
Patented Jan. 21, 1964

3,118,946
PROCESS FOR MANUFACTURE OF UNSATURATED ALIPHATIC AMINO-DIOLS, AND NITRO INTERMEDIATE
Cyril Grob and Erwin Jenny, Basel, Switzerland, assignors to Ciba Corporation, a corporation of Delaware
No Drawing. Filed Apr. 8, 1958, Ser. No. 727,024
Claims priority, application Switzerland Apr. 9, 1957
9 Claims. (Cl. 260—584)

The present invention is for an improvement of the process described in the co-pending application Serial No. 662,582, filed May 31, 1957, now U.S. Patent 3,060,196, by Cyril Grob, which process is for the manufacture of 1:3-dihydroxy-2-amino-alk-4-enes of the formula

R—CH=CH—CHOH—CHNH$_2$—CH$_2$OH in which R represents an alkyl group, and especially a higher alkyl group, and acyl-compounds thereof, in the form of their various isomers such as the threo- and erythro-compounds, their cis- and trans-forms and their optical antipodes. In that process an alk-2-ynal-(1) is condensed with β-nitro-ethanol, the resulting 1:3-dihydroxy-2-nitro-alk-4-yne is reacted with an aldehyde, in the resulting nitro-meta-dioxane, if desired after isomerization, the nitro group is reduced, if desired the amino group so formed is acylated, the dioxane ring is split up at any stage of the process after reducing the nitro group, the triple bond is converted into a double bond, and, if desired, the amino-diol so obtained is converted into an acyl-derivative or an acyl-derivative obtained in the process is converted into the amino-diol and/or a racemate so obtained is split up into its optical antipodes and/or a base so obtained is converted into a salt thereof or a salt so obtained is converted into the free base.

The present invention is based on the observation that the aforesaid process can be simplified by reducing the 1:3-dihydroxy-2-nitro-alk-4-yne. It is therefore not necessary to prepare the nitro-meta-dioxane compound prior to reduction of the nitro group.

Prior to the aforesaid reduction the 1:3-dihydroxy-nitro-alk-4-yne may be split up into its diastereoisomers, advantageously by crystallization. Reduction of the nitro diols is advantageously carried out with an acid agent, primarily zinc and hydrochloric acid or with iron and acetic acid, but any other desired acid agent may be used, for example, aluminum amalgam in ether and a little glacial acetic acid. In this manner the corresponding 1:3-dihydroxy-2-amino-alk-4-ynes are obtained. In an amino-diol so obtained the triple bond is converted into a double bond in accordance with a process of the aforesaid co-pending application Serial No. 662,582, filed May 31, 1957, now U.S. Patent 3,060,196, by Cyril Grob. For this purpose there is advantageously used hydrogen in the presence of a Lindlar catalyst or a palladium catalyst poisoned with quinoline, whereby cis-compounds are obtained. In order to obtain the transisomers reduction is advantageously carried out with an alkali metal, especially sodium or potassium in the presence of an alcohol or with a dimetal hydride, such as lithium-aluminum hydride, preferably in tetrahydrofurane.

Alternatively, the nitro group and the triple bond can be reduced in one operation. To this end, the nitro-alk-4-yne compounds are treated preferably with a di-metal hydride, such as lithium-aluminum hydride, and trans-amino-alk-4-enes obtained. Corresponding cis-compounds are obtained by treatment with catalytically activated hydrogen, such as hydrogen in the presence of a Lindlar catalyst, the first stage, i.e., the reduction of the triple bond to a double bond proceeding rapidly, and the second stage, i.e., the reduction of the nitro group, proceeding slowly. The reduction in the presence of a Lindlar catalyst is preferably carried out in alcohol, there being obtained after the uptake of 1 molecular equivalent of hydrogen cis-1:3-dihydroxy-2-nitro-alk-4-enes as intermediate product, which can be isolated, if desired. When hydrogen is used in the presence of a platinum catalyst, the reduction is stopped when the required quantity of hydrogen has been taken up. In these reactions mixtures of different reaction products are often obtained. They can be separated in the usual manner. The aforementioned reductions are preferably carried out in rectified alcohol. The amino-diols so obtained may, if desired, be converted in known manner into their acyl-derivatives. Racemates so obtained may be converted, for example, by treatment with glutamic acid or by microbiological means, into their optical antipodes.

Depending on the conditions of the reaction the amino-diols are obtained in the form of their free bases or in the form of their salts, and advantageously as salts with acids, such as hydrohalic acids, for example, hydrochloric acid, sulfuric acid, phosphoric acids, perchloric acid, acetic acid, citric acid, oxalic acid, tartaric acid, ascorbic acid, methane sulfonic acid, hydroxyethane sulfonic acid, para-toluene sulfonic acid or salicylic acid, para-amino-salicylic acid or acetyl-salicylic acid. The bases can be converted in known manner into their salts and salts obtained can be converted into the bases in the usual manner.

The starting materials used in the present process are known or can be made by methods in themselves known.

The invention also includes any modification of the process, in which a product obtainable at any stage of the process is used as starting material and the remaining steps of the process are carried out or the process is interrupted at any stage.

The products of the process are useful as medicaments or as intermediate products for making medicaments.

The following examples illustrate the invention:

*Example 1*

47 grams of hexadec-2-ynal-(1) and 20 grams of nitro-ethanol are first cooled to 0° C. and then added to a cooled suspension of 2 grams of potassium carbonate in 90 cc. of methanol. After standing for 15 minutes at 0° the mixture is freed from potassium carbonate by suction filtering and rendered acid with 3 cc. of concentrated hydrochloric acid in 5 cc. of methanol at 0° C., the solution is extracted with ether, and the ethereal extracts are washed and dried with sodium sulfate. By evaporating the extracts there is obtained a yellow syrup, which is dissolved in 40 cc. of ether, and the solution is diluted in 400 cc. of pentane. The solution so obtained is allowed to stand for 16 hours at 22° C., and is then filtered to remove the precipitated threo-1:3-dihydroxy-2-nitro-octadec-4-yne melting at 74–75° C. and having the formula

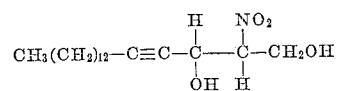

The mother liquors are evaporated and mixed with 250 cc. of pentane. In this manner a further quantity of crystals melting at 69–72° C., are precipitated, and the latter are mixed with the crystals first obtained, and after recrystallization from a mixture of ether and pentane the product melts at 74–75° C. The filtrate is allowed to stand at 0° C. for 48 hours. The precipitated crystals of erythro-1:3-dihydroxy-2-nitro-octadec-4-yne of the formula

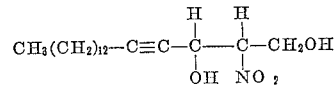

melt at 43–45° C. after recrystallization.

4.0 grams of erythro-1:3-dihydroxy-2-nitro-octadec-4-yne are dissolved in 30 cc. of ethanol, and the solution is slowly added dropwise, while cooling with ice and stirring, to a mixture of 10 cc. of concentrated hydrochloric acid and 10 cc. of ethanol. At the same time 8.0 grams of zinc dust are added in small portions, and during the reduction at intervals of about 5–10 minutes four portions of 5 cc. each of concentrated hydrochloric acid are added. The whole is then further stirred for about 20–30 minutes. Any frothing can be controlled by spraying in small quantities of alcohol. The reaction mixture is then filtered with suction, and the excess of zinc dust is washed with aqueous ethanol and the filtrate is rendered alkaline with 10 N-solution of caustic soda. The mixture is extracted with ether, the ethereal portions are washed with water to neutral, dried over sodium sulfate, filtered and evaporated. The crystalline residue, which is erythro-1:3-dihydroxy-2-amino-octadec-4-yne of the formula

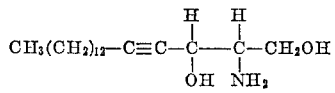

can be recrystallized from a mixture of chloroform and pentane and then melts at 74–77° C.

2.0 grams of crude erythro-1:3-dihydroxy-2-amino-octadec-4-yne are heated in 50 cc. of absolute tetrahydrofurane with 1.5 grams of lithium-aluminum hydride for 4 hours on the steam bath. 4 N-hydrochloric acid is then added while cooling with ice, the mixture is concentrated somewhat in vacuo and then extracted with ether. The ethereal extracts are washed with 4 N-hydrochloric acid, a 2 N-solution of sodium carbonate and with water, and dried over sodium sulfate and evaporated in vacuo. By recrystallization from a mixture of ether and pentane there is obtained erythro-trans-DL-1:3-dihydroxy-2-amino-octadec-4-ene, which has the configuration of natural erythro-trans-sphingosin. It melts at 64–68° C.

The lithium-aluminum hydride solution can also be mixed with about 10 cc. of water, filtered and evaporated. The residue gives the same product on recrystallization from a mixture of chloroform and pentane.

Example 2

10 grams of threo-1:2-dihydroxy-2-nitro-octadec-4-yne are reduced in a manner analogous to that described in Example 1 and there is obtained threo-1:3-dihydroxy-2-amino-octadec-4-yne of the formula

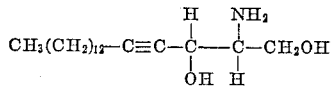

which melts at 83–84° C. after recrystallization from a mixture of chloroform and pentane.

Instead of zinc and hydrochloric acid there may be used for the reduction iron and acetic acid or aluminum amalgam in ether with a small amount of glacial acetic acid.

Example 3

2 grams of threo-1:3-dihydroxy-2-nitro-octadec-4-yne, obtained as described in Example 1, are suspended in 50 cc. of 60% aqueous acetic acid, and 13 grams of iron powder added. The reaction temperature rises slowly to 30° C. Stirring is then continued for 1 hour at 40° C. The reaction product is diluted with methanol, filtered, and the filtrate poured into a mixture of 24 grams of powdered potassium sulfide and 160 cc. of methanol. The precipitated iron sulfide is removed by filtration, the filtrate acidified with concentrated hydrochloric acid, the crystalline potassium chloride filtered off, the filtrate evaporated at 40° C. under reduced pressure, the residue rendered alkaline with 10 N-sodium hydroxide solution, and extracted with ether. The ethereal extract is washed neutral with water and dried over sodium sulfate, then evaporated to dryness under reduced pressure, and the residue recrystallized from a mixture of chloroform and pentane. There is obtained in this manner the threo-1,3-dihydroxy-2-amino-octadec-4-yne of melting point 82–84° C. which gives no mixed melting point depression with material produced in a different manner.

Example 4

0.5 gram of threo-1,3-dihydroxy-2-nitro-octadec-4-yne, obtained as described in Example 1, is dissolved in 20 cc. of ether, mixed with 2 cc. of water, 4 cc. of glacial acetic acid, and with aluminum amalgam obtained from 0.5 gram of aluminum, and the mixture is stirred for 8 hours at room temperature. The aluminum sludge is filtered off, the remainder extracted twice with boiling ether, the ethereal extracts are extracted by shaking them with 2 N-hydrochloric acid, and washed with water. The aqueous hydrochloric acid solution containing the resulting amino-diol in the form of its hydrochloride is rendered alkaline with 2 N-caustic soda solution and the mixture extracted with ether. The ethereal extracts are washed with water, dried over sodium sulfate, and the ether evaporated under reduced pressure. The oil which remains behind is dissolved in a small quantity of benzene, the solution mixed with pentane, and the threo-1,3-dihydoxy-2-amino-octadec-4-yne of melting point 83–84° C. obtained.

Example 5

5 grams of pure threo-1,3-dihydroxy-2-nitro-octadec-4-yne, obtained as described in Example 1, are dissolved in 40 cc. of absolute tetrahydrofurane and, while stirring, a solution of 5.4 grams of lithium-aluminum hydride in 90 cc. of absolute tetrahydrofurane is added slowly. The reaction temperature rises to 65° C. The mixture is then refluxed for 5 hours. The excess lithium-aluminum hydride is decomposed with 35 cc. of water, the precipitated sludge filtered off with suction, and the filtrate evaporated at 40° C. in a water pump vacuum. The residue is sublimed under a high vacuum at a bath temperature of 120° C. and the sublimate recrystallized from a mixture of chloroform and pentane. The product so obtained melts at 95–97° C. and gives no mixed melting point depression with threo-trans-1,3-dihydro-2-amino-octadec-4-ene melting at 95–97° C. and produced in a different manner.

Example 6

10 grams of pure threo-1,3-dihydroxy-2-nitro-octadec-4-yne, obtained as described in Example 1, are dissolved in 250 cc. of absolute ethyl acetate and the solution hydrogenated with hydrogen at room temperature under atmospheric pressure in the presence of 1 gram of Lindlar catalyst. When 1 equivalent of hydrogen has been taken up the reaction comes to a standstill, after which the solution is freed from the catalyst and evaporated at 40° C. under reduced pressure. The residue is recrystallized from a mixture of chloroform and pentane and gives lustrous lamellae of melting point 79–80° C.; they have the formula

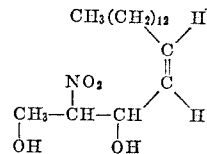

Example 7

1 gram of pure threo-1,3-dihydroxy-2-nitro-octadec-4-yne obtained as described in Example 1 is dissolved in 25 cc. of rectified alcohol and the solution agitated at room temperature and under atmospheric pressure with 50 mg. of platinum oxide in the presence of hydrogen. When about 3.8 molecular equivalents of hydrogen have been consumed the hydrogen uptake slows down markedly. The hydrogenation is stopped, the crystalline product dissolved by heating, the solution filtered, and the filtrate evaporated. The residue is recrystallized from a mixture of chloroform and pentane. There is thus obtained a mixture melting at 75–85° C. and consisting mainly of threo-1,3-dihydoxy-2-amino-octadecane and the unsaturated cis-threo-1,3-dihydroxy-2-amino-octadec-4-ene.

*Example 8*

1 gram of pure threo-1,3-dihydroxy-2-nitro-octadec-4-yne, obtained as described in Example 1, is dissolved in 25 cc. of rectified alcohol and agitated at room temperature and under atmospheric pressure in an atmosphere of hydrogen in the presence of 100 mg. of Lindlar catalyst. 1 equivalent of hydrogen is taken up very rapidly. Hydrogenation ceases after the uptake of another 2.6 molecular equivalents of hydrogen. The reaction solution is worked up in the usual manner and given, after recrystallization from a mixture of chloroform and pentane, a mixture of melting point 65–70° C. which contains the desired threo-cis-1,3-dihydroxy-2-amino-octadec-4-ene.

What is claimed is:

1. A process for the manufacture of a member selected from the group consisting of threo-cis-1,3-dihydroxy-2-amino-octadec-4-ene, threo-trans-1,3-dihydroxy-2-amino-octadec-4-ene, erythro-cis-1,3-dihydroxy-2-amino - octadec-4-ene and erythro-trans-1,3-dihydroxy-2-amino-octadec-4-ene in substantially pure form, which comprises (a) separating by crystallization a mixture of diastereoisomers of threo-1,3-dihydroxy-2-nitro-octadec-4-yne and erythro-1,3-dihydroxy-2- nitro-octadec-4-yne and (b) reducing the thus obtained member selected from the group consisting of threo-1,3-dihydroxy-2-nitro-octadec-4-yne and erythro-1,3-dihydroxy-2-nitro-octadec-4-yne with a member selected from the group consisting of zinc, iron and aluminum in the presence of an acid selected from the group consisting of hydrochloric acid and acetic acid and (c) reducing to a double bond the triple bond of the thus obtained member selected from the group consisting of threo-1,3-dihydroxy-2-amino-octadec-4-yne and erytho-1,3-dihydroxy-2-amino-octadec-4-yne with a member selected from the group consisting of (1) lithium aluminum hydride and (2) hydrogen in the presence of a poisoned palladium catalyst.

2. A process for the manufacture of a member selected from the group consisting of threo-1,3-dihydroxy-2-amino-octadec-4-yne and erythro-1,3-dihydroxy-2-amino-octadec-4-yne in substantially pure form, which comprises (a) separating by crystallization a mixture of diastereoisomers of threo-1,3-dihydroxy-2-nitro-octadec-4-yne and erythro-1,3-dihydroxy-2-nitro-octadec-4-yne and (b) reducing the thus obtained member selected from the group consisting of threo-1,3-dihydroxy-2-nitro-octadec-4-yne and erythro-1,3-dihydroxy-2-nitro-octadec-4-yne with a member selected from the group consisting of zinc, iron and aluminum in the presence of an acid selected from the group consisting of hydrochloric acid and acetic acid.

3. A process according to claim 1 wherein the reduction (b) is carried out with zinc and hydrochloric acid.

4. A process according to claim 1 wherein step (c) is performed with hydrogen in the presence of a palladium catalyst up to the consumption of about 1 molar equivalent of hydrogen, whereby a member selected from the group consisting of threo-cis-1,3-dihydroxy-2-amino-octadec-4-ene and erythro-cis-1,3-dihydroxy-2-amino-octadec-4-ene is obtained.

5. A process according to claim 1, wherein step (c) is performed with lithium aluminum hydride, whereby a member selected from the group consisting of threo-trans-1,3-dihydroxy-2-amino-octadec-4-ene and erythro-trans-1,3-dihydroxy-2-aminooctadec-4-ene is obtained.

6. A process for the manufacture of a member selected from the group consisting of threo-trans-1,3-dihydroxy-2-amino-octadec-4-ene and erythro-trans-1,3-dihydroxy-2-amino-octadec-4-ene in substantially pure form, which comprises (a) separating by crystallization a mixture of diastereoisomers of threo-1,3-dihydroxy-2-nitro-octadec-4-yne and erythro-1,3-dihydroxy-2-nitro-octadec-4-yne and (b) reducing the thus obtained member selected from the group consisting of threo-1,3-dihydroxy-2-nitro-octadec-4-yne and erythro-1,3-dihydroxy-2-nitro-octadec-4-yne with lithium aluminum hydride.

7. A process for the manufacture of a member selected from the group consisting of threo-cis-1,3-dihydroxy-2-nitro-octadec-4-ene and erythro-cis - 1,3 - dihydroxy-2-nitro-octadec-4-ene in substantially pure form, which comprises (a) separating by crystallization a mixture of diastereoisomers of threo-1,3-dihydroxy-2-nitro-octadec-4-yne and erythro-1,3-dihydroxy-2-nitro-octadec-4-yne and (b) reducing the thus obtained member selected from the group consisting of threo-1,3-dihydroxy-2-nitro-octadec-4-yne and erythro-1,3-dihydroxy-2-nitro-octadec-4-yne with hydrogen in the presence of a poisoned palladium catalyst, whereby a member selected from the group consisting of threo-cis-1,3-dihydroxy-2-nitro-octadec-4-ene and erythro-cis-1,3-dihydroxy-2-nitro-octadec-4-ene is obtained.

8. A process for the manufacture of a member selected from the group consisting of threo-cis-1,3-dihydroxy-2-amino-octadec-4-ene, threo-trans-1,3-dihydroxy-2-amino-octadec-4-ene, erythro-cis-1,3-dihydroxy-2-amino-octadec-4-ene, erythro-trans-1,3-dihydroxy-2-amino-octadec-4-ene in substantially pure form, which comprises (a) reducing the substantially pure member selected from the group consisting of threo-1,3-dihydroxy-2-nitro-octadec-4-yne and erythro-1,3-dihydroxy-2-nitro-octadec-4-yne with a member selected from the group consisting of zinc, iron and aluminum in the presence of an acid selected from the group consisting of hydrochloric acid and acetic acid and (b) reducing to a double bond the triple bond of the thus obtained member selected from the group consisting of threo-1,3-dihydroxy-2-amino-octadec-4-yne and erythro-1,3-dihydroxy-2-amino-octadec-4-yne with a member selected from the group consisting of (1) lithium aluminum hydride and (2) hydrogen in the presence of a poisoned palladium catalyst.

9. 1:3-dihydroxy-2-nitro-octadec-4-ene.

References Cited in the file of this patent

Degering: "An Outline of Organic Nitrogen Compounds," University Lithoprinters; Ypsilanti, Michigan, 1950, pp. 70–71.

Lindlar: "Helvetia Chim. Acta," vol. 35, pp. 446–50 (1952).

Nieuwland et al.: "The Chemistry of Acetylene," American Chemical Society Monograph No. 99 (1954), pp. 95–98.

Ahmad: "Journal of the Indian Chemical Society," volume 31, pp. 309–310 (1954).

Gaylord: "Reduction With Complex Metal Hydrides," Interscience Publishers, Inc., New York (1956), pp. 762–763.

Grob et al.: "Experientia," vol 12, pp. 334–5 (1956).

Grob et al.: "Chem. and Ind.," 1956, pp. 660–1 (1956).

Fieser et al.: "Org. Chemistry," pp. 269–275 (1956 Ed.).

Gaylord: "Reduction With Complex Metal Hydrides," p. 771 (1956).